(12) United States Patent
Park et al.

(10) Patent No.: US 7,804,755 B2
(45) Date of Patent: Sep. 28, 2010

(54) METHOD FOR DETERMINING CHARACTERISTICS OF SIGNAL AND APPARATUS USING THE SAME

(75) Inventors: Hyun-soo Park, Seoul (KR); Jae-wook Lee, Osan-si (KR); Jae-seong Shim, Seoul (KR); Jung-hyun Lee, Seoul (KR); Eing-seob Cho, Yongin-si (KR); Eun-jin Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1119 days.

(21) Appl. No.: 10/979,815

(22) Filed: Nov. 3, 2004

(65) Prior Publication Data

US 2005/0128918 A1    Jun. 16, 2005

(30) Foreign Application Priority Data

Nov. 11, 2003  (KR) ............... 10-2003-0079596
Aug. 25, 2004  (KR) ............... 10-2004-0067191

(51) Int. Cl.
G11B 7/00 (2006.01)

(52) U.S. Cl. ............ 369/59.17; 369/59.18; 369/59.21; 369/59.27

(58) Field of Classification Search ............ 369/59.17, 369/59.18, 59.21, 59.22, 59.26, 59.27
See application file for complete search history.

(56) References Cited

U.S. PATENT DOCUMENTS

| | | | |
|---|---|---|---|
| 5,287,385 | A | 2/1994 | Sugawara et al. |
| 6,618,338 | B1 | 9/2003 | Fujiwara et al. |
| 6,977,970 | B2 | 12/2005 | Shim et al. |
| 2001/0016002 | A1* | 8/2001 | Shim et al. ............ 375/232 |
| 2002/0041550 | A1 | 4/2002 | Coene et al. |
| 2002/0071194 | A1* | 6/2002 | Honma ............ 360/51 |

FOREIGN PATENT DOCUMENTS

| | | |
|---|---|---|
| JP | 06-295540 | 10/1994 |
| JP | 09-045015 | 2/1997 |
| JP | 09-061474 | 3/1997 |
| JP | 09-330565 | 12/1997 |

(Continued)

OTHER PUBLICATIONS

A study of PRML systems for a phase change optical disk., vol. 95 No. 402. Dec. 8, 1995.

(Continued)

*Primary Examiner*—Jorge L Ortiz Criado
(74) *Attorney, Agent, or Firm*—NSIP Law

(57) ABSTRACT

A method of determining characteristics of a signal and an apparatus using the method. The apparatus for determining characteristics of a signal includes: a level detector receiving sample values of a radio frequency (RF) signal and binary data obtained by binarizing the RF signal, generating selection signals based on the binary data, classifying each of the sample values of the RF signal into one of a plurality of levels using the selection signals, and outputting average values of sample values of each level; and a signal characteristics determiner determining a characteristics value that indicates the characteristics of the RF signal using the average values of the sample values belonging to each level.

16 Claims, 7 Drawing Sheets

FOREIGN PATENT DOCUMENTS

| | | |
|---|---|---|
| JP | 10-112130 | 4/1998 |
| JP | 10-214461 | 8/1998 |
| JP | 2000-215622 | 8/2000 |
| JP | 2000-261272 | 9/2000 |
| JP | 2001-126264 | 5/2001 |
| JP | 2001-256736 | 9/2001 |
| JP | 2002-092879 | 3/2002 |
| JP | 2002-150621 | 5/2002 |
| JP | 2002-163825 | 6/2002 |
| JP | 2002-197660 | 7/2002 |
| JP | 2002-269924 | 9/2002 |
| JP | 2002-319231 | 10/2002 |
| JP | 2003-187441 | 7/2003 |
| JP | 2003-196838 | 7/2003 |
| JP | 2003-242725 | 8/2003 |
| JP | 2003-263746 | 9/2003 |
| WO | WO 00/42610 | 7/2000 |

OTHER PUBLICATIONS

Japanese Office Action issued on Feb. 23, 2010, in corresponding Japanese Application No. 2006-539367 (6 pages).

* cited by examiner

METHOD FOR DETERMINING CHARACTERISTICS OF SIGNAL AND APPARATUS USING THE SAME

CROSS-REFERENCE TO RELATED APPLICATIONS

This application claims the priority of Korean Patent Application Nos. 2003-79596 and 2004-67191, filed on Nov. 11, 2003, and Aug. 25, 2004, respectively, in the Korean Intellectual Property Office, the disclosures of which are incorporated herein by reference.

BACKGROUND OF THE INVENTION

1. Field of the Invention

The present invention relates to a method of determining the characteristics of a signal and an apparatus using the method, and more particularly, to a method of determining the characteristics of a RF signal obtained from an optical disc and an apparatus using the same.

2. Description of Related Art

A beam reflected from an optical disc is converted into an electric signal to generate binary data which is recorded in the optical disc by a specified signal processing technique. A signal obtained by converting the beam reflected from the optical disc into the electric signal is called a RF (Radio Frequency) signal. Even though binary data is recorded in the optical disc, the RF signal obtained from the optical disc has analog signal properties due to the characteristics of the optical disc and optical characteristics. The RF signal is binarized to obtain the binary data.

Typically, a variety of indexes that indicate the characteristics of the RF signal obtained from the optical disc exist. Such indexes include, for example, an asymmetry of RF signal and a modulation ratio of the same. The RF signal includes a signal having various periods depending on the modulation of data and which code is used. For example, in a case where the RF signal is modulated using a (2,10) code, a 3T signal that is 3 times the basic feet period is a signal having the shortest period and an 11T signal is a signal having the longest period. The asymmetry is a scale indicating how far the center of a signal having a specified period shorter than the longest period is away from the center of a signal having the longest period. The modulation ratio is a scale indicating how small the size of the signal having a specified period shorter than the longest period is compared to the size of signal having the longest period. FIG. 1 is a graph illustrating an eye-pattern signal in order to describe the asymmetry and modulation ratio. The eye-pattern eye is obtained by simultaneously displaying signals having a variety of periods obtained from the optical disc on an oscilloscope.

Referring to FIG. 1, 11TTOP and 11TBTM indicate the maximum value and the minimum value, respectively, of the 11T signal, which is a signal having the longest period, in a case where a signal is modulated using a (2,10) code. 3TTOP and 3TBTM indicate the maximum value and the minimum value, respectively, of the 3T signal, which is a signal having the shortest period. The asymmetry and modulation ratio of the RF signal are calculated using 11TTOP, 11TBTM, 3TTOP, and 3TBTM. The asymmetry and modulation ratio are disclosed in detail in U.S. Pat. No. 5,490,127.

The foregoing asymmetry and modulation ratio are required to have a value within a specified range so that a data recording and/or reproducing device in which the optical disc is loaded can reproduce the data recorded in the optical disc without error. Therefore, it is essential to exactly measure a scale indicating characteristics of the RF signal such as asymmetry and modulation ratio, etc.

However, an increase in recording density of the optical disc and/or deterioration of recording quality thereof result in deteriorating quality of the RF signal obtained from the optical disc. Accordingly, it is difficult to exactly determine a scale that indicates the characteristics of the RF signal such as asymmetry and modulation ratio, etc.

BRIEF SUMMARY

An embodiment of the present invention provides a method of determining characteristics of signal and apparatus using the same so as to more exactly determine the characteristics of the RF signal.

According to an aspect of the present invention, there is provided an apparatus for determining characteristics of a signal, including: a level detector receiving sample values of a radio frequency (RF) signal and binary data obtained by binarizing the RF signal, generating selection signals based on the binary data, classifying each of the sample values of the RF signal into one of a plurality of levels using the selection signals, and outputting average values of sample values of each level; and a signal characteristics determiner determining a characteristics value that indicates the characteristics of the RF signal using the average values of the sample values belonging to each level.

According to another aspect of the present invention, there is provided a method of determining characteristics of a signal, including: generating selection signals used to classify sample values of a radio frequency (RF) signal into levels using binary data obtained by binarizing the RF signal; classifying the sample values of the RF signal into levels using the respective selection signals and obtaining an average value of sample values of each level; and determining a characteristics value that indicates characteristics of the RF signal using the average value of sample values of each level.

According to another aspect of the present invention, there is provided a computer-readable storage medium encoded with processing instructions for causing a processor to execute a method of determining characteristics of a signal, the method including: generating selection signals used to classify sample values of a radio frequency (RF) signal into levels using binary data obtained by binarizing the RF signal; classifying the sample values of the RF signal into levels using the respective selection signals and obtaining an average value of sample values of each level; and determining a characteristics value that indicates characteristics of the RF signal using the average value of sample values of each level.

An apparatus for detecting binary data from a radio frequency (RF) signal, including: a level detector receiving sample values of a radio frequency (RF) signal and binary data obtained by binarizing the RF signal, generating selection signals based on the binary data, classifying each of the sample values of the RF signal into one of a plurality of levels using the selection signals, and outputting average values of sample values of each level; and a signal characteristics determiner determining a characteristics value that indicates the characteristics of the RF signal using the average values of the sample values belonging to each level.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
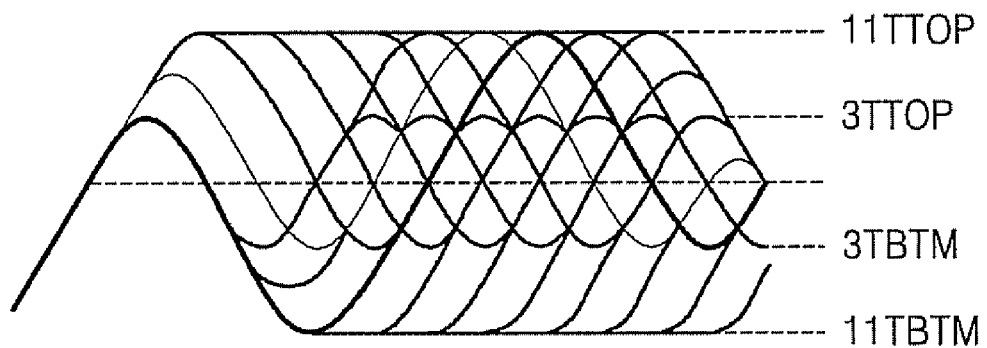
FIG. 1 is a graph illustrating an eye-pattern signal.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
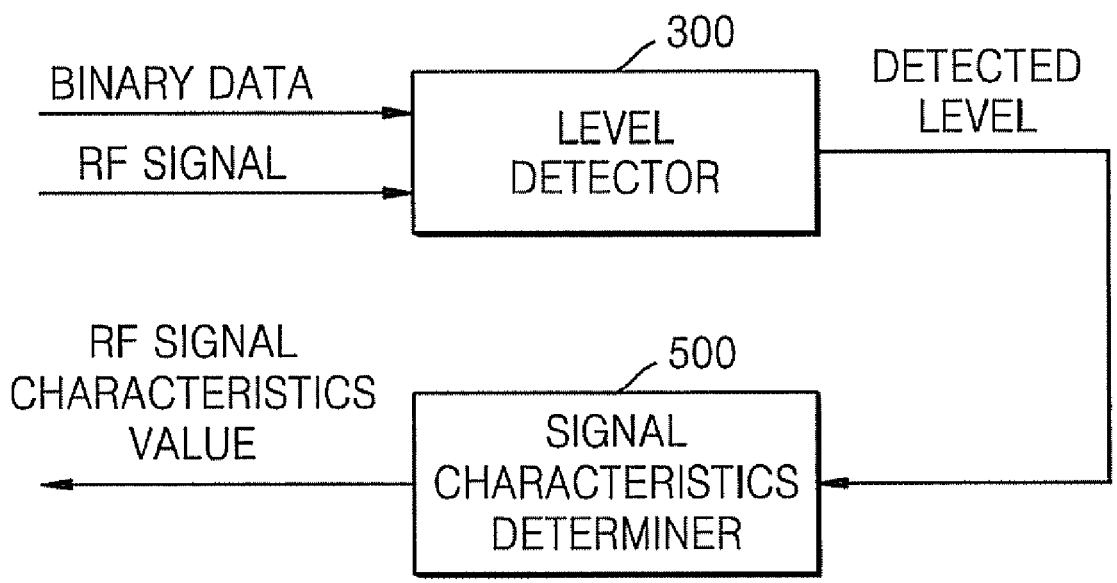
FIG. 2 is a block view illustrating an apparatus determining the characteristics of a signal according to an embodiment of the present invention.

FIG. 2 is a block diagram of an apparatus that determines the characteristics of a signal according to an embodiment of the present invention. Referring to FIG. 2, the apparatus includes a level detector 300 and a signal characteristics determiner 500.

The level detector 300 receives an RF signal obtained from an optical disc (not shown) and binary data obtained by binarizing the RF signal according to a specified method, generates a selection signal using the binary data in order to classify each sample value of the RF signal by levels, classifies the sample values of the RF signal into their respective levels using the selection signal, and then outputs an average value of sample values of each level.

The signal characteristics determiner 500 determines a specified characteristics value that indicates the characteristics of the RF signal using the average values of sample values of each level of the RF signal outputted from the level detector 300.

Figure 3:
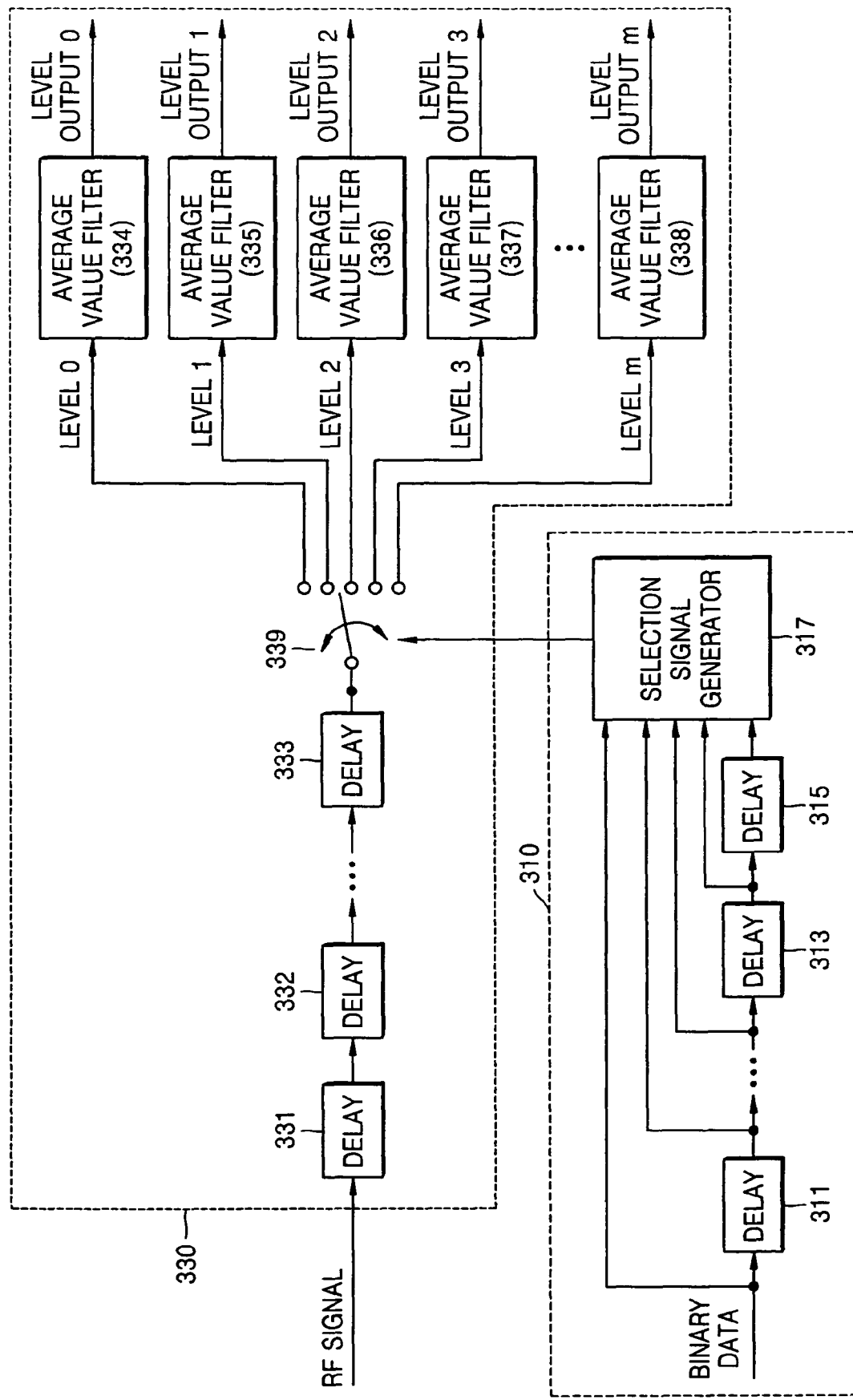
FIG. 3 is a block diagram of an example of a level detector 300 shown in FIG. 2.

FIG. 3 is a block diagram of an example of the level detector 300 shown in FIG. 2. Referring to FIG. 3, the level detector 300 includes a signal estimator 310 and a channel identifier 330.

Figure 7:
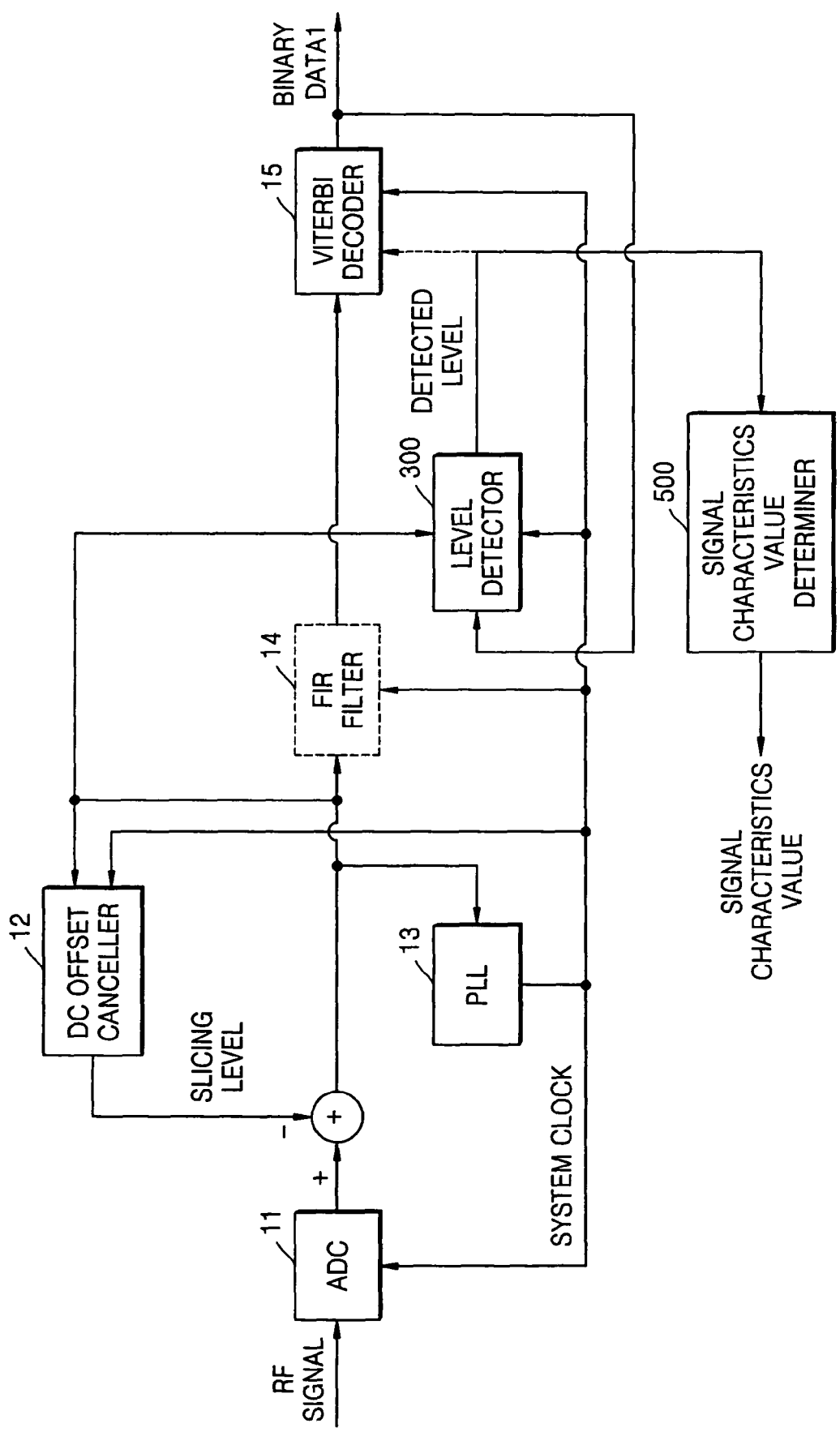
FIG. 7 is a block diagram of an example of a binary data detecting apparatus including the signal characteristics determiner shown in FIG. 2 according to one embodiment of the present invention.
Figure 8:
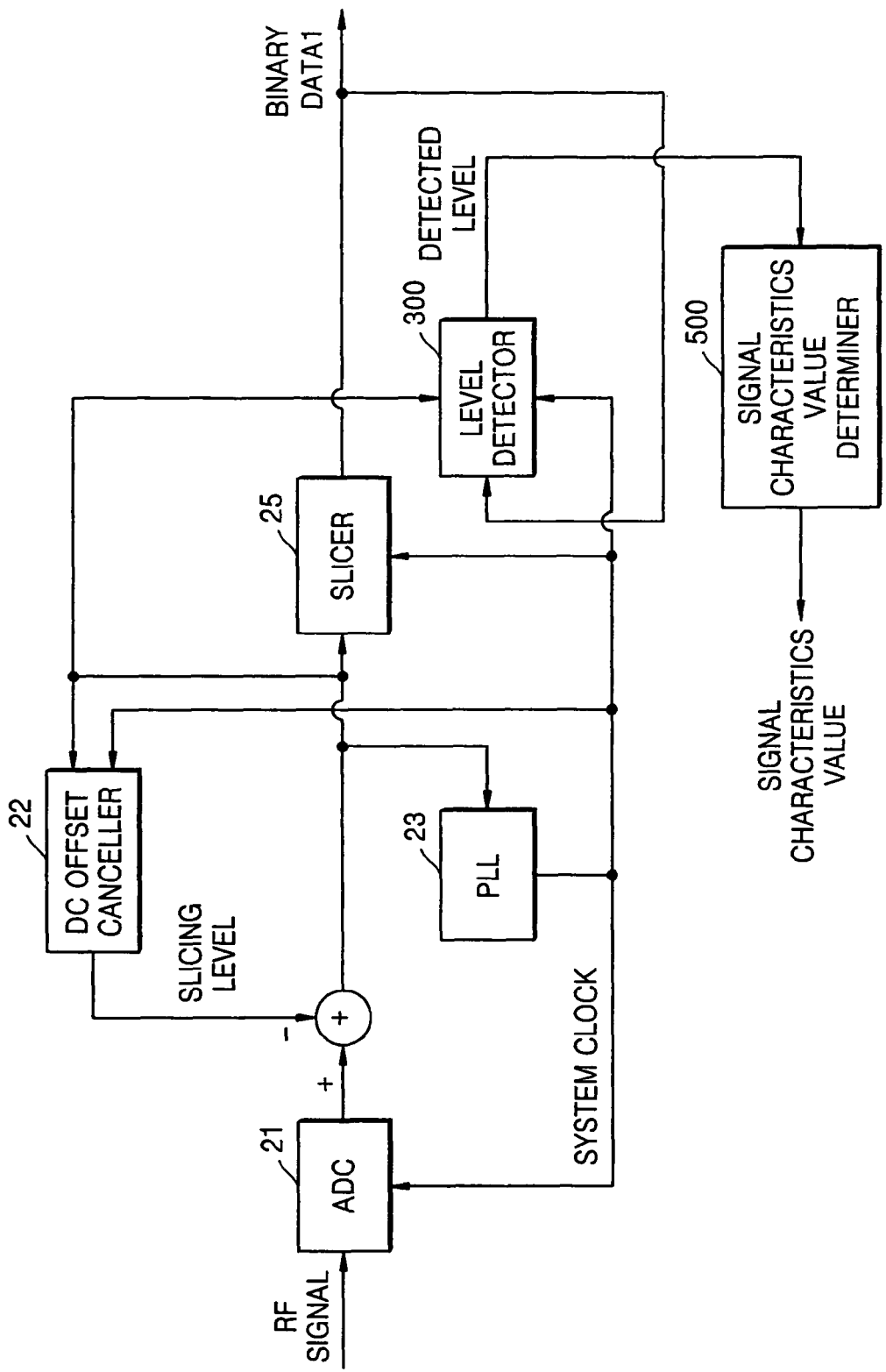
FIG. 8 is a block diagram of an example of a binary data detecting apparatus including the signal characteristics determining apparatus shown in FIG. 2 according to another embodiment of the present invention.

The signal estimator 310 receives binary data obtained by binarizing the RF signal according to a specified method. Output of a viterbi decoder 15 may be used as shown in FIG. 7 in order to obtain binary data. To be more specific, binary data obtained by viterbi decoding of the RF signal is again used as input of the signal estimator 310. However, a variety of different binarization methods may be used to obtain binary data to be used as input of the signal estimator 310. For example, as shown in FIG. 8, the output of a slicer 25 may be used as input of the signal estimator 310.

The signal estimator 310 includes a plurality of delayers 311 through 315 that delay each binary data value for a time corresponding to the sampling period of the RF signal, and a selection signal generator 317 that generates a selection signal used to control the channel identifier 330.

The sample values of the RF signal may be divided into several levels. Ideally, the sample values of the RF signal should have a fixed level; however, they include errors due to components such as various noise, limitations of quality of an optical disc and performance of a recording and/or reproducing device, etc. The channel identifier 330 classifies each sample value of the RF signal into a corresponding level according to the selection signal outputted from the signal estimator 310. The channel identifier 330 outputs Level Output 0 through Level Output m, which are average values of sample values of the RF signal classified into levels.

The selection signal generator 317 receives a plurality of binary values from the delayers (311 through 315) and binary data input. Here, each of the binary values includes one bit received from each of the delayers (311 through 315) and binary data input. Each binary value received by the selection signal generator 317 corresponds to a sample value of the RF signal received by the channel identifier 330. Based on the received binary values, the selection signal generator 317 generates selection signals corresponding to the respective sample values of the RF signal, and provides the channel identifier 330 with the generated selection signals. That is, the signal estimator 310 determines levels to which the sample values of the RF signal output from delayer 333 belong, and generates selection signals corresponding to the determined levels. A switch 339 outputs the sample values of the RF signal output from the delayer 333 to a single filter among a plurality of average value filters 334 through 338 depending on the generated selection signals.

The average value filters 334 through 338 output Level Output 0 through Level Output m, respectively, which are obtained by averaging the sample values of the RF signal belonging to the respective levels. The respective average value filters 334 through 338 may use a low pass filter in order for realization.

Equation 1 described below indicates an example in which Level Output 0 through Level Output m are obtained by the average value filters 334 through 338, respectively.

updated level=previous level+(delayed input signal−previous level)/constant   [Equation 1]

As the constant value becomes larger and larger in the Equation 1, since the value of the updated level becomes small, a general follow-up gets slower. When the obtained level value is inputted into the viterbi decoder, the signal can be decoded by the viterbi decoder under optimum conditions.

Meanwhile, the RF signal which is inputted to the channel identifier 330 is delayed by a number of regular system clock cycles by a plurality of delayers 331 through 333 in order to synchronize it with the selection signal output from the selection signal generator 317.

The signal characteristics determiner 500 receives from the level detector 300 Level Output 0 through Level Output m, which are the estimation values of ideal level values of the RF signal, and operates a specified value indicating the characteristics of the RF signal. Asymmetry, modulation ratio, and non-linearity, etc., may be used as specified values indicating the characteristics of the RF signal.

Figure 4:
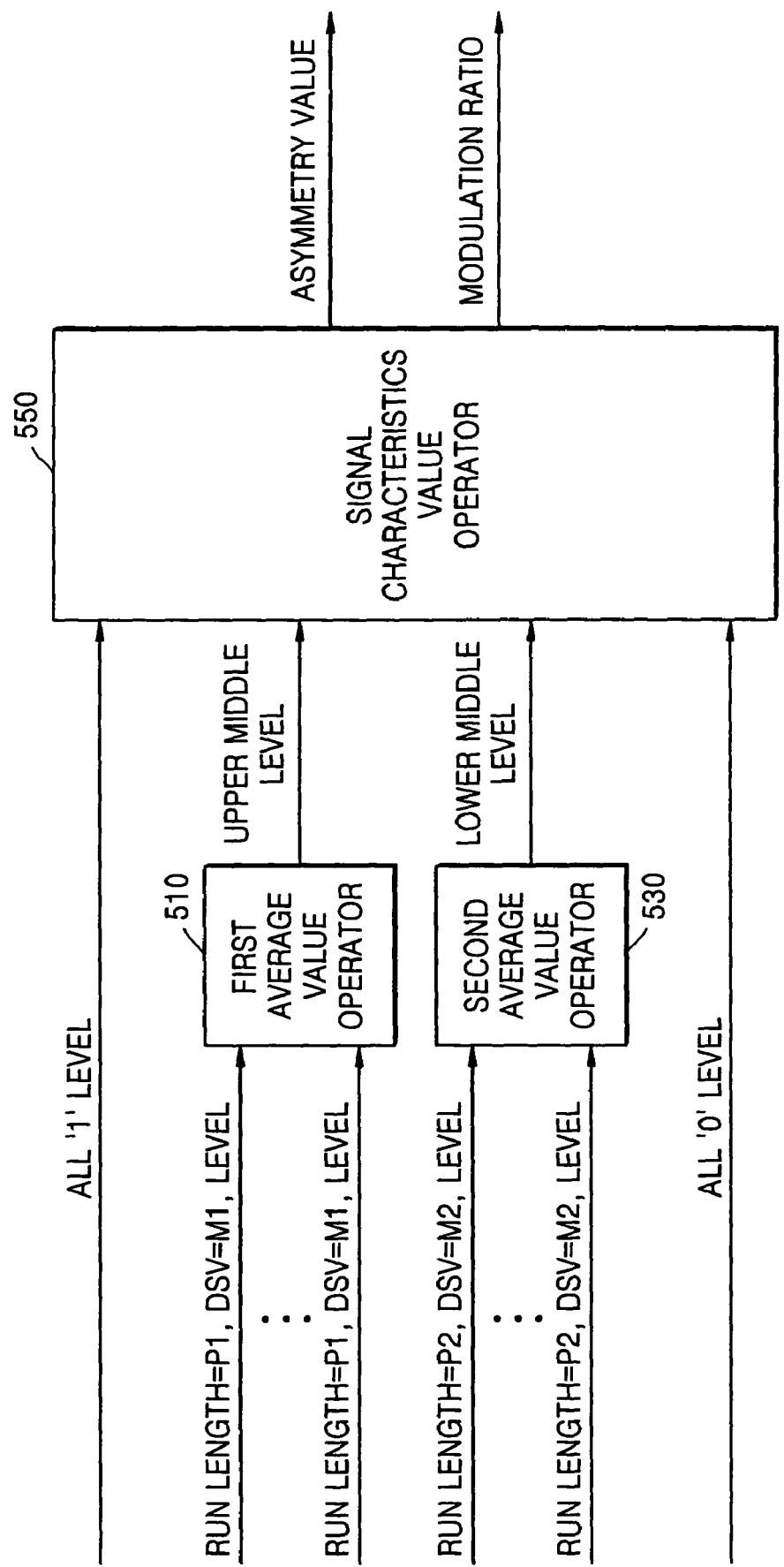
FIG. 4 is a block diagram of an example of a signal characteristics determiner 500 shown in FIG. 2.

FIG. 4 is a block diagram of an example of the signal characteristics determiner 500 shown in FIG. 2. The signal characteristics determiner 500 according to one embodiment of the present invention receives from the level detector 300 Level Output 0 through Level Output m, which are the estimation values of ideal level values of the RF signal, and operates the asymmetry and the modulation ratio of the RF signal.

Asymmetry is a scale indicating how far the center of a signal having a specified period shorter than the longest period is away from the center of a signal having the longest period. The modulation ratio is a scale indicating how small the size of a signal having a specified period shorter than the longest period is compared to the size of a signal having the longest period.

Equation 2 described below indicates an example of obtaining an asymmetry value.

$$\text{ASYMMETRY VALUE} = \frac{\frac{ALL`1`LEVEL + ALL`0`LEVEL}{2} - \frac{UPPER\ MIDDLE\ LEVEL + LOWER\ MIDDLE\ LEVEL}{2}}{ALL`1`LEVEL - ALL`0`LEVEL} \quad \text{[Equation 2]}$$

Equation 3 described below indicates an example of obtaining the modulation ratio.

$$\text{MODULATION RATIO} = \frac{UPPER\ MIDDLE\ LEVEL - LOWER\ MIDDLE\ LEVEL}{ALL`1`LEVEL - ALL`0`LEVEL} \quad \text{[Equation 3]}$$

ALL'1'LEVEL, which is a level corresponding to the case where all the binary values inputted to the selection signal generator 317 for generating the selection signal are "1," indicates the maximum value of the RF signal, i.e., a signal having the longest period obtained from the optical disc. The ALL'0'LEVEL, which is a level corresponding to the case where all the binary values inputted to the selection signal generator 317 are "0," indicates the minimum value of the RF signal, i.e., the signal having the longest period. The UPPER MIDDLE LEVEL and LOWER MIDDLE LEVEL indicate the maximum value and minimum value, respectively, of a signal having a specified period shorter than the period of the signal having the longest period.

Referring to FIG. 4, the signal characteristics determiner 500 includes a first average value calculator 510, a second average value calculator 530, and a signal characteristics value calculator 550. The signal characteristics value calculator 550 receives ALL'1'LEVEL, ALL'0'LEVEL, UPPER MIDDLE LEVEL, and LOWER MIDDLE LEVEL and calculates the asymmetry value and modulation ratio according to Equations 2 and 3. The signal characteristics determiner 500 receives a plurality of binary values inputted to the selection signal generator 317 in order to generate a selection signal, determines levels corresponding to each sample value of the RF signal, generates a selection signal corresponding to the determined level, and provides the channel identifier 330 with the generated selection signal.

The run length indicates the number of consecutive "0"s or "1"s in a plurality of binary values inputted to the selection signal generator 317. For example, if a binary sequence inputted to the selection signal generator 317 is "11001", the run length becomes 2. According to the present embodiment, even when the run length is identical, binary sequences having a different DSV (digital sum value) exist. The DSV indicates the result of summing up all the bits by replacing 1 in case of a data bit of 1, and by replacing −1 in case of a data bit of 0.

Even though the run length is identical, there exist two cases having a different DSV. If the average of the corresponding level values is obtained in a case where the run length and DSV are identical, an average value in the desired run length and DSV is obtained. In this regard, a large DSV is defined to upper middle level, and a small DSV to lower middle level. According to the present embodiment, the first average value operator 510 receives the corresponding level values in a case where the run length is P1, and the DSV is M1, and outputs the upper middle level. The second average value operator 530 receives the corresponding level values in a case where the run length is P2, and the DSV is M2, and outputs the lower middle level. In the present embodiment, P1 is the same as P2.

Figure 5:
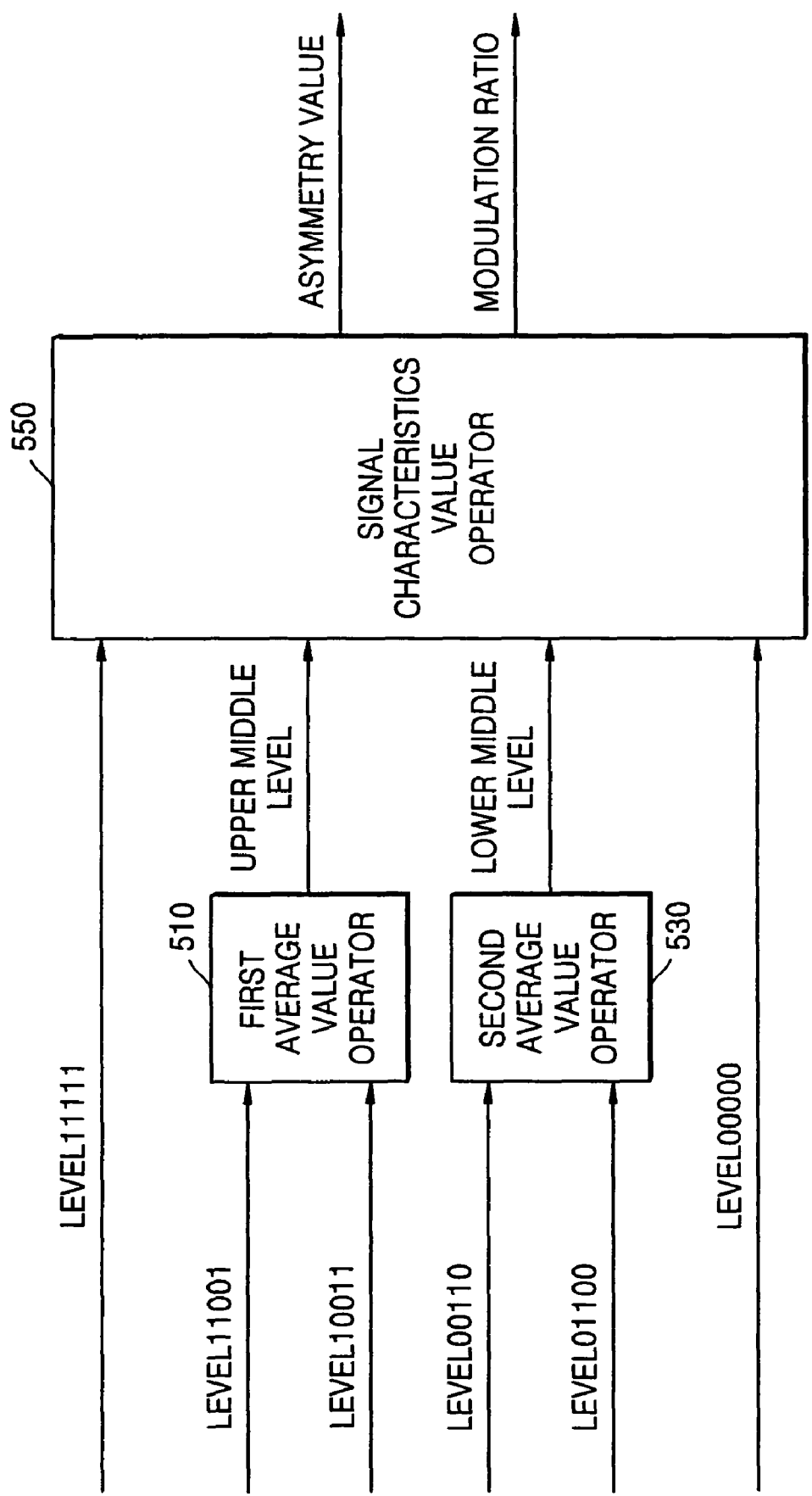
FIG. 5 is a block diagram showing an example of input/output signals of the signal characteristics determiner 500 in a case where a (1,7) code of 5 tap is used.

FIG. 5 is block diagram showing an example of input/output signals of the signal characteristics determiner 500 in case where a (1,7) code of 5 tap is used. The use of 5 taps indicates 5 binary values are input to the selection signal generator 317 as shown in FIG. 3 by placing 4 delayers at the front end of the selection signal generator 317.

Since 5 binary values are input to the selection signal generator 317, each selection signal generated by the selection signal generator 317 can indicate one of 32 levels. However, since a 1T signal does not exist in the (1,7) code, 16 levels exist when excluding the level that includes the 1T signal. The level 11111 becomes all'1'level, and level 00000 becomes all'0'level. The level 11001 and the level 10011, which are levels including a 2T signal, are used for operating the upper middle level since the DSV is 1, and the level 00110 and the level 01100, which are levels including a 2T signal, are used for operating the lower middle level since the DSV is −1.

Figure 6:
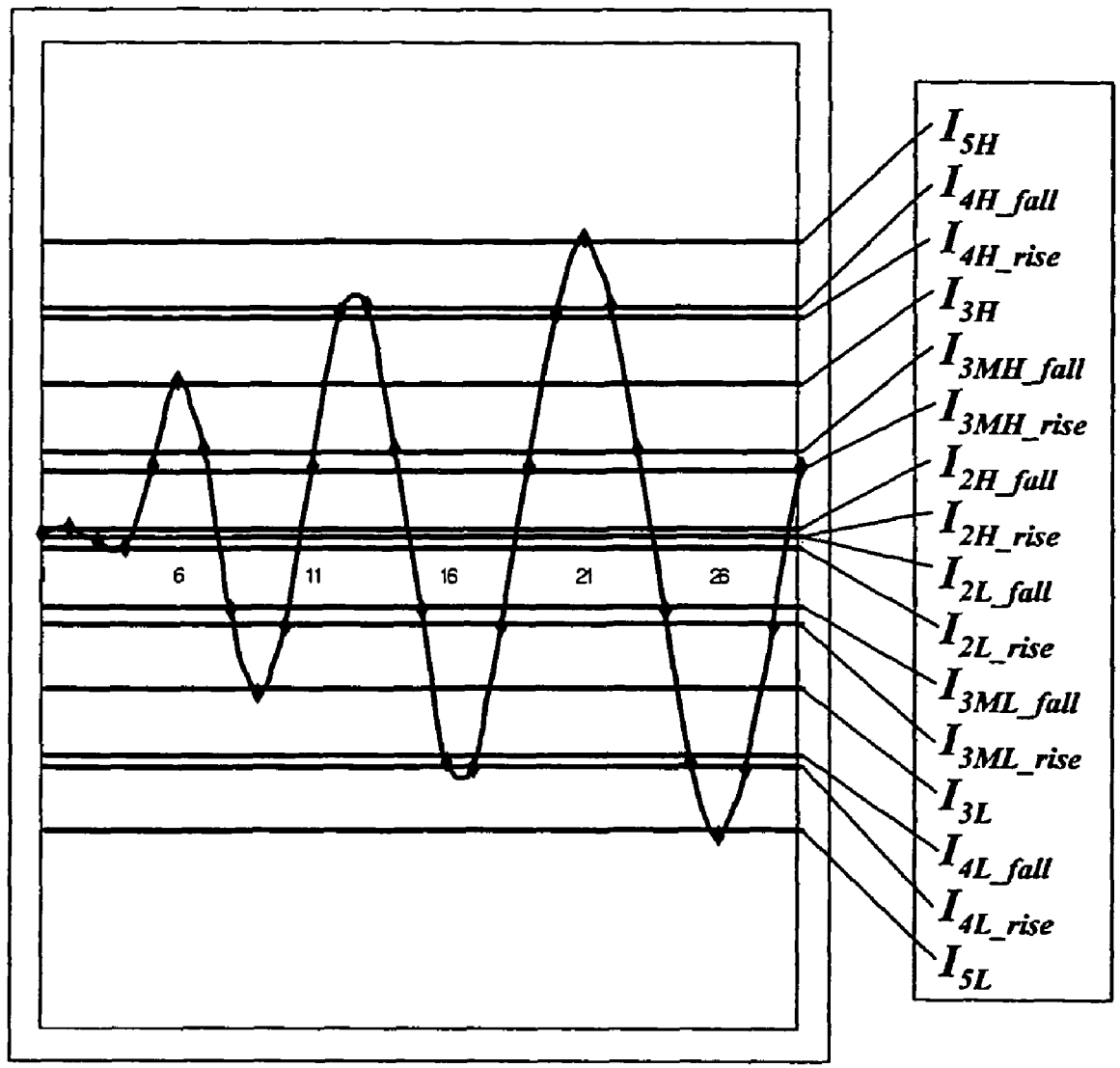
FIG. 6 illustrates a sampled RF signal in the case of the (1,7) code.

Non-linearity of the RF signal is used in addition to the asymmetry and modulation ratio thereof as a characteristic value indicating the characteristics of the RF signal. FIG. 6 illustrates an RF signal sampled in the case of the (1,7) code. The non-linearity of the RF signal shown in FIG. 6 is obtained according to Equation 4 described below.

$$LNL = \frac{\sum_{i=2}^{5} ||I_{iH} - I_{center}| - |I_{iL} - I_{center}||}{I_{5pp}} \quad \text{[Equation 4]}$$

In Equation 4, I2H is (I2H_fall+I2H_rise)/2, I4H is (I4H_fall+I4H_rise)/2, I2L is (I2L_fall+I2L_rise)/2, I4L is (I4L_fall+I4L_rise)/2, and I5PP is I5H-I5L.

$$PRNL = \frac{\sum_{i=2}^{5} (|I_{iH\_rise} - I_{iH\_fall}| - |I_{iL\_rise} - I_{iL\_fall}|)}{I_{5pp}} \quad \text{[Equation 5]}$$

In Equation 5, I3H_rise is I3 MH_rise, I3H_fall is I3MH_fall, I3L_rise is I3ML_rise, and I3L_fall is I3ML_fall.

In Equations 4 and 5, LNL is an abbreviation of Level Non-Linearity, and PRNL is an abbreviation of Partial Response Non-Linearity. Referring to FIG. 6, if the RF signal has a perfect linearity, the value of I4H_fall should be the same as the value of I4H_rise. Likewise, the value of I3 MH_fall and the value of I3 MH_rise, and the value of I2H_rise and the value of I2H_fall, etc. should be identical to each other. However, if the RF signal is not linear, the sample values which correspond to each other are not the same, as shown in FIG. 6. LNL and PRNL indicate the degree of non-linearity of the RF signal, i.e., the degree that the sample values which correspond to each other are not same. By Equations 4 and 5, the non-linearity of the level of a positive number part and the level of a negative number part of the RF signal, and a non-linearity part which differs by an ascending edge and a descending edge can each be obtained.

The non-linearity, the asymmetry, and the modulation ratio of the RF signal are described above as characteristic values that indicate the characteristics of the RF signal. However, a variety of signal characteristics values can be additionally obtained by using the detected level values, output from the level detector 300 according to one embodiment of the present invention.

FIG. 7 is a block diagram of an example of a binary data detecting apparatus including the signal characteristics determining apparatus shown in FIG. 2 according to one embodiment of the present invention. The binary data detecting apparatus detects the binary data from the RF signal. The binary data detecting apparatus shown in FIG. 7 includes an analog-to-digital converter (ADC) 11, a DC offset canceller 12, a PLL 13, an FIR filter 14, a viterbi decoder 15, a level detector 300, and a signal characteristics determining apparatus including a signal characteristics determiner 500 according to one embodiment of the present invention.

The ADC 11 samples the RF signal by a specified period and outputs the sampled RF signal. The DC offset canceller 12 receives the output sampled RF signal, and cancels a DC offset value. The PLL 13 generates a system clock signal and provides it to the ADC 11 and the DC offset canceller 12. Since the viterbi decoder 15 is generally designed supposing that the channel characteristics are regular, the FIR filter 14 may be used in order to adjust the channel characteristics of the signal inputted to the viterbi decoder 15.

The viterbi decoder 15 obtains the binary data from the RF signal by using the level values of the RF signal detected by the level detector 300.

The binary data detecting apparatus shown in FIG. 7 uses the viterbi decoder 15 and the FIR filter 14, which makes it possible to improve the system performance and obtain an output having a high quality.

FIG. 8 is a block diagram of a binary data detecting apparatus including the signal characteristics determining apparatus shown in FIG. 2 according to another embodiment of the present invention. The binary data detecting apparatus shown in FIG. 8 is used to obtain the non-linearity or modulation ratio indicating characteristics of the RF signal even in a case where the apparatus uses a slicer 25 without using the viterbi decoder of FIG. 7.

It is possible for an embodiment of the present invention to be realized on a computer-readable recording medium as a computer-readable code. Computer-readable recording mediums include every kind of recording device that stores computer system-readable data. ROM, RAM, CD-ROM, magnetic tape, floppy disc, optical data storage, etc. are used as a computer-readable recording medium.

As described above, it is possible to more exactly determine a specified characteristics value indicating characteristics of the RF signal according to one embodiment of the present invention. Furthermore, realization of hardware and a usage of the output binary data of the viterbi decoder make it possible to more exactly determine characteristics of the RF signal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for determining characteristics of a signal, comprising:
   an analog-to-digital converter receiving radio frequency (RF) signal, sampling the RF signal, and outputting the sampled RF signal;
   a binary data obtaining unit obtaining binary data from the sampled RF signal and outputting the binary data;
   a plurality of delayers receiving the binary data and outputting delayed binary data;
   a selection signal generator receiving the binary data and the delayed binary data received from each of the plurality of delayers, and generating a selection signal;
   a channel identifier receiving the sampled RF signal, and outputting average value of the sampled RF signal according to the selection signal; and
   a signal characteristics determiner receiving the average value of the sampled RF signal and determining a characteristics value that indicates the characteristics of the RF signal using the received average value of the sampled RF signal.

2. The apparatus of claim 1, wherein the plurality of delayers delay the binary data for a time corresponding to a sampling period of the RF signal and output a specified number of bits of consecutive bit information extracted from the binary data.

3. The apparatus of claim 1, wherein the channel identifier includes a plurality of average value filters that obtain the average value of the sampled RF signal.

4. The apparatus of claim 3, wherein the average value filters are low pass filters.

5. The apparatus of claim 1, wherein the binary data obtaining unit obtains the binary data by viterbi decoding of the sampled RF signal.

6. The apparatus of claim 1, wherein the binary data obtaining unit obtains the binary data by slicing of the sampled RF signal.

7. The apparatus of claim 3, wherein the channel identifier further includes a switch outputting the sampled RF signal to a single filter among the plurality of average value filters according to the selection signal.

8. The apparatus of claim 7, wherein the each binary data received by the selection signal generator corresponds to the sampled RF signal received by the channel identifier.

9. The apparatus of claim 7, wherein the channel identifier further includes
   a plurality of delayers delaying the sampled RF signal and outputting the delayed sampled RF signal to the switch.

10. The apparatus of claim 3, wherein the average values output by the average value filters are obtained by the following equation:

updated average value=previous average value+(delayed input signal−previous average value)/constant.

11. The apparatus of claim 1, wherein the sampled RF signal which is input to the channel identifier is delayed by a number of regular system clock cycles in order to synchronize the input —with the selection signal outputted from the selection signal generator.

12. The apparatus of claim 1, wherein the characteristics value indicates an asymmetry of the RF signal which is a scale indicating how far a center of a signal having a specified period shorter than a longest period is away from a center of a signal having a longest period and is determined by the following equation:

$$\text{ASYMMETRY VALUE} = \frac{\frac{ALL\text{'}1\text{'}LEVEL + ALL\text{'}0\text{'}LEVEL}{2} - \frac{\text{UPPER MIDDLE LEVEL} + \text{LOWER MIDDLE LEVEL}}{2}}{ALL\text{'}1\text{'}LEVEL - ALL\text{'}0\text{'}LEVEL}$$

wherein the UPPER MIDDLE LEVEL and the LOWER MIDDLE LEVEL indicate the maximum value and minimum value, respectively, of a signal having a specified period shorter than the period of the signal having the longest period.

13. The apparatus of claim 1, wherein the characteristics value indicates a modulation ratio of the RF signal which is a scale indicating how small the size of a signal having a specified period shorter than a longest period is compared to the size of a signal having a longest period and is determined by the following equation:

$$\text{MODULATION RATIO} = \frac{\text{UPPER MIDDLE LEVEL} - \text{LOWER MIDDLE LEVEL}}{ALL\text{'}1\text{'}LEVEL - ALL\text{'}0\text{'}LEVEL}$$

wherein the UPPER MIDDLE LEVEL and the LOWER MIDDLE LEVEL indicate the maximum value and minimum value, respectively, of a signal having a specified period shorter than the period of the signal having the longest period.

14. A computer readable medium encoded with processing instructions for causing a computer to execute a method of determining characteristics of a signal, the method comprising:

sampling a RF signal using an analog-to-digital converter;
obtaining binary data from the sampled RF signal;
delaying the binary data using a plurality of delayers;
generating selection signal using the binary data and the delayed binary data output from the each of the plurality of delayers;
obtaining average value of the sampled RF signal according to the selection signal; and
determining a characteristics value of the RF signal using the obtained average value of the sampled RF signal.

15. An apparatus for detecting binary data from a radio frequency (RF) signal, comprising:
an analog-to-digital (ADC) converter that samples a radio frequency (-RF) signal by a specified period and outputs the sampled RF signal;
a DC offset canceller that receives the sampled RF signal output from the ADC converter and cancels a DC offset value from the sampled RF signal;
a PLL that generates a system clock signal and outputs the clock signal to the ADC and the DC offset canceller;
a plurality of delayers receiving binary data and outputting delayed binary data;
a selection signal generator receiving the binary data and the delayed binary data received from each of the plurality of delayers, and generating a selection signal;
a channel identifier receiving the sampled RF signal, and outputting average value of the sampled RF signal according to the selection signal; and
a signal characteristics determiner receiving the average value of the sampled RF signal and determining a characteristics value that indicates the characteristics of the RF signal using the received average value of the sampled RF signal, wherein the characteristics value indicates one of asymmetry, a modulation ratio, or a non-linearity of the RF signal;
a viterbi decoder that obtains the binary data from the sampled RF signal using the average value of the sampled RF signal output from the channel identifier; and
a FIR filter that adjust the channel characteristics of the signal input to the viterbi decoder.

16. The apparatus of claim 1, wherein the characteristics value indicates a non-linearity of the RF signal.

* * * * *